United States Patent [19]
Goya

[11] Patent Number: 5,468,086
[45] Date of Patent: Nov. 21, 1995

[54] METAL CONNECTOR FOR CONSTRUCTION

[76] Inventor: Shigeru Goya, 27-1, Kumoji 3-chome, Naha-shi, Okinawa-ken, Japan

[21] Appl. No.: 154,522

[22] Filed: Nov. 19, 1993

[30] Foreign Application Priority Data

Dec. 9, 1992 [JP] Japan ................................ 4-094351 U
May 31, 1993 [JP] Japan ................................ 5-034073 U

[51] Int. Cl.⁶ .................................. F16B 9/00; E04B 7/06
[52] U.S. Cl. ........................ 403/260; 403/403; 403/230; 403/217; 403/169; 52/655.1; 52/656.9; 52/707
[58] Field of Search ...................... 403/255, 254, 403/260, 264, 231, 403, 230, 217, 169, 174, 178, 245, 246; 411/103, 108; 52/632, 655.1, 656.9, 701, 704, 706, 707

[56] References Cited

U.S. PATENT DOCUMENTS

| | | | |
|---|---|---|---|
| 3,945,742 | 3/1976 | Condevaux | 403/255 |
| 4,261,665 | 4/1981 | Hsiung | 403/254 X |
| 4,607,972 | 8/1986 | Hennick | 403/255 X |
| 4,925,331 | 5/1990 | Bertsche | 52/707 X |
| 4,981,388 | 1/1991 | Becken et al. | 403/403 X |

FOREIGN PATENT DOCUMENTS

| | | | |
|---|---|---|---|
| 538053 | 6/1922 | France | 403/260 |
| 92332 | 6/1897 | Germany | 403/260 |

*Primary Examiner*—Anthony Knight
*Attorney, Agent, or Firm*—Kanesaka & Takeuchi

[57] ABSTRACT

A metal connector includes a main metal member in the form of a tube which may be passed through a hole formed in a wooden member, a stop welded to one end of the main metal member, elongated holes formed in the lateral sides of the main metal member in the vicinity of its other end so as to permit a pin to be passed through it, and a tightening bolt threadedly engaged in the other end of the main metal member so that its distal end abuts against the pin. Alternatively, a metal connector includes a through-hole formed in the lateral side of the main metal member in the vicinity of its one end so as to be passed through by a bolt, and a tightening bolt threadedly engaged in the other end of the main metal member so that the distal end of the bolt is abutted against the pin when the bolt is tightened. Consequently, the wooden members of a construction may be connected easily and tightly to one another, while the mounting of the metal connector may be simplified with a view to improving the operating efficiency.

6 Claims, 6 Drawing Sheets

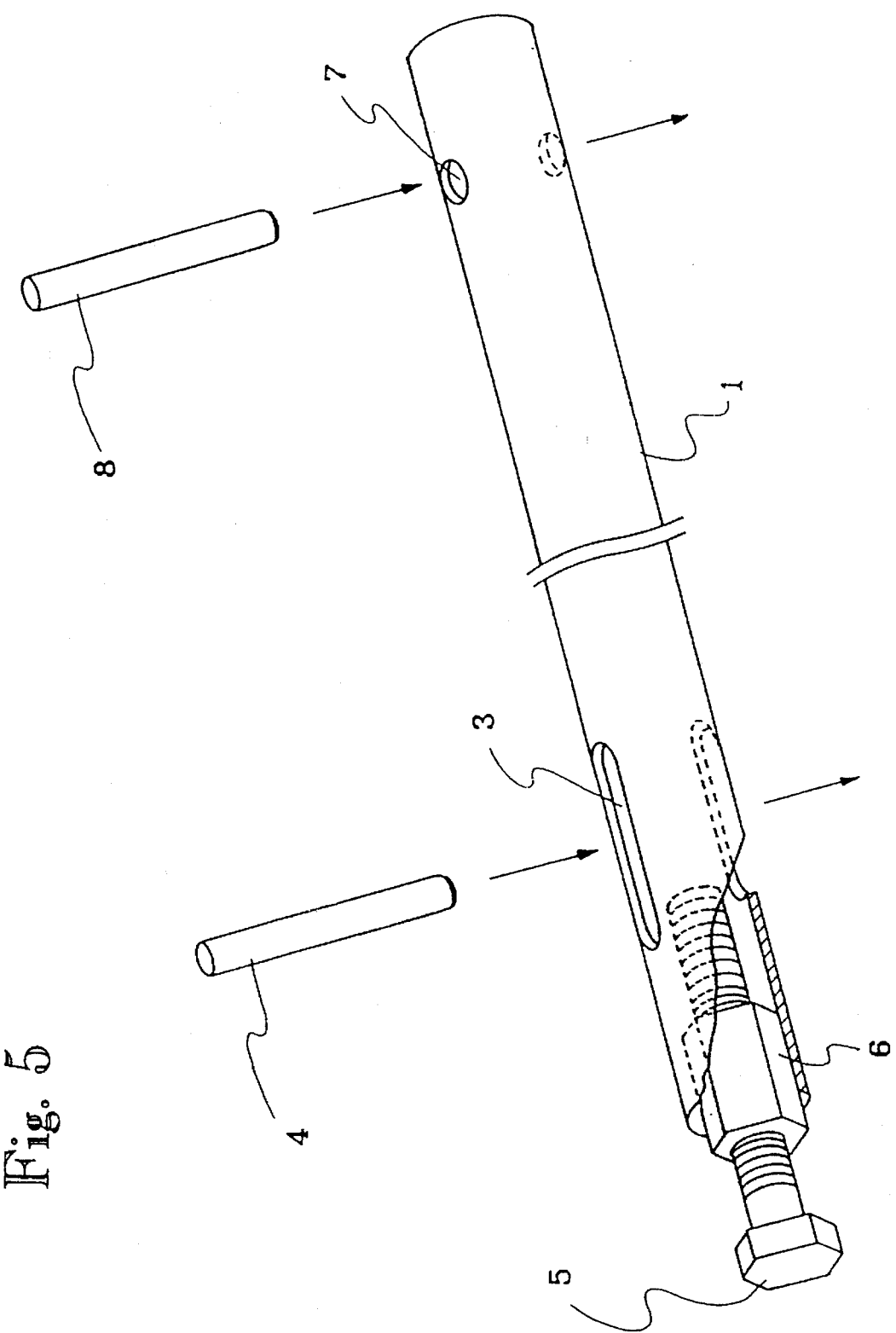

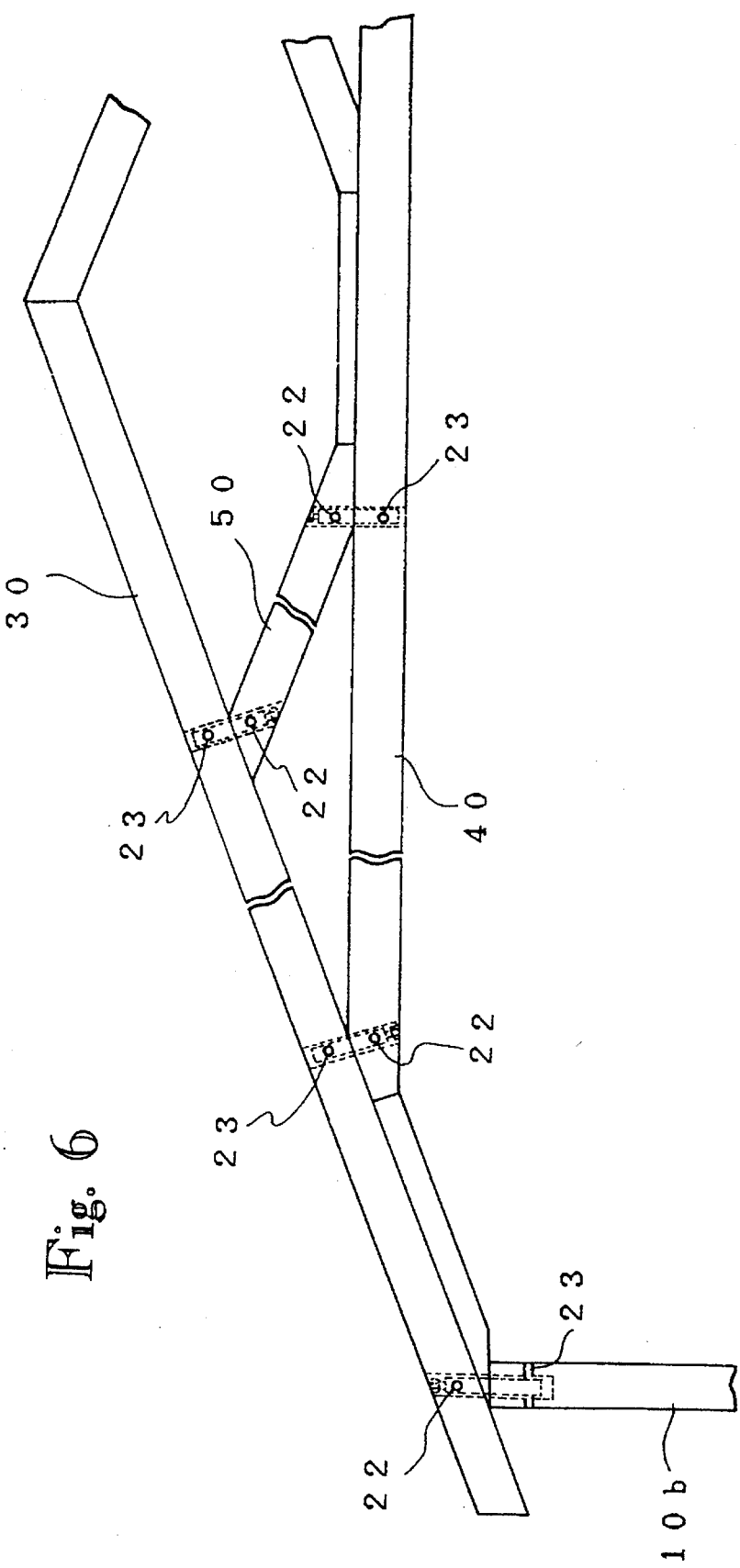

METAL CONNECTOR FOR CONSTRUCTION

BACKGROUND OF THE INVENTION

1. Technical Field of the Invention

This invention relates to a metal connector for a construction or a building which is employed for connecting wooden members for a wooden construction, such as a girth, a pole plate or a joist on one hand and a horizontal angle brace on the other hand, or connecting wooden members, such as a principal rafter or a knee brace, to one another.

2. Description of the Related Art

Up to now, the connection between the girth, the pole plate or the beam and the horizontal angle brace, or the connection between wooden members, such as a principal rafter and a tie beam or the principal rafter and a knee brace, for a wooden construction is made by providing a tilt or tenon connection on connecting surfaces of the wooden members by way of jointing or connecting, and by tapping a female threaded hole as a bolt hole into which a bolt is introduced and tightened in position.

The connection operation between the girth, pole plate or the joist and the horizontal angle brace, or the connection operation between the wooden members such as the principal rafter and the tie beam or the principal rafter and the knee brace is difficult to perform with a wooden working tool or machine so that it must be performed by a manual operation of a skilled carpenter. Besides, the operation is extremely laborious since it has to be carried out in a construction site.

OBJECTS OF THE INVENTION

It is a primary object of the present invention to overcome the abovementioned problem and to provide a metal connector for a construction in which the connecting operation so performed in the construction site for connecting the girth, the pole plate or the joist and the horizontal angle brace or connecting the principal rafter and the tie beam or the principal rafter and the knee brace may be eliminated, so the connecting operation for the connecting surfaces may be made by a wooden working machine at a factory and the connecting operation in the construction site may also be facilitated.

Meanwhile, the wooden members to be connected together may be variable as to the length and the connecting angle from one construction to another.

Consequently, it is necessary to provide a universal metal connector in order to cope with various connecting portions. It is a second object of the present invention to provide a metal connector for a construction which fulfills the above-mentioned primary object and which may be employed for connecting all kinds of wooden members.

SUMMARY OF THE INVENTION

For accomplishing the above-mentioned primary object of the present invention, there is provided a metal connector for connecting a wooden member, such as a girth, a pole plate or a beam, to another wooden member such as a horizontal angle brace, to each other. The metal connector comprises a main metal member in the form of a tube which may be passed through a hole formed in the wooden member, while a stop is provided at one end of the main metal member at an angle corresponding to a connecting angle of the wooden members. A pair of elongated holes are formed in the lateral sides of the main metal member in the vicinity of the other end thereof so as to be passed through by a pin, and a tightening bolt is provided at the other end of the main metal member so as to abut against the pin when tightened.

With the metal connector according to the present invention, the wooden members may be connected to one another easily and rigidly.

Besides, the working of the wooden members required for employing the metal connector, the mounting of the wooden members, and the mounting of the metal connector are extremely simple so that the operating efficiency of the connecting operation in its entirety may be improved significantly.

For accomplishing the above-mentioned second object, there is also provided a metal connector for a construction for connecting wooden members, such as a principal raft and a tie beam, or wooden members such as a principal rafter and a knee brace, to each other. The metal connector comprises a main metal member in the form of a tube which may be passed through a hole formed in the wooden member. A through-hole is formed in the main metal member in the vicinity of one end thereof so as to be passed through by a bolt or a pin, while a pair of elongated holes are formed in the lateral sides of the main metal member in the vicinity of the other end thereof so as to be passed through by a pin, and a tightening bolt is provided at the other end of the main metal member so as to abut against the pin when tightened.

The metal connector of the present invention having such arrangement may be employed for connecting all sorts of the wooden members.

BRIEF DESCRIPTION OF THE DRAWINGS

FIG. 5 is a perspective view showing a third embodiment of the present invention.

FIG. 6 is a partial side elevation showing wooden members connected together using the metal connector according to the third embodiment.

DETAILED DESCRIPTION OF PREFERRED EMBODIMENTS OF THE INVENTION

Illustrative embodiments of the present invention will be hereinafter explained with reference to the drawings.

Figure 1:
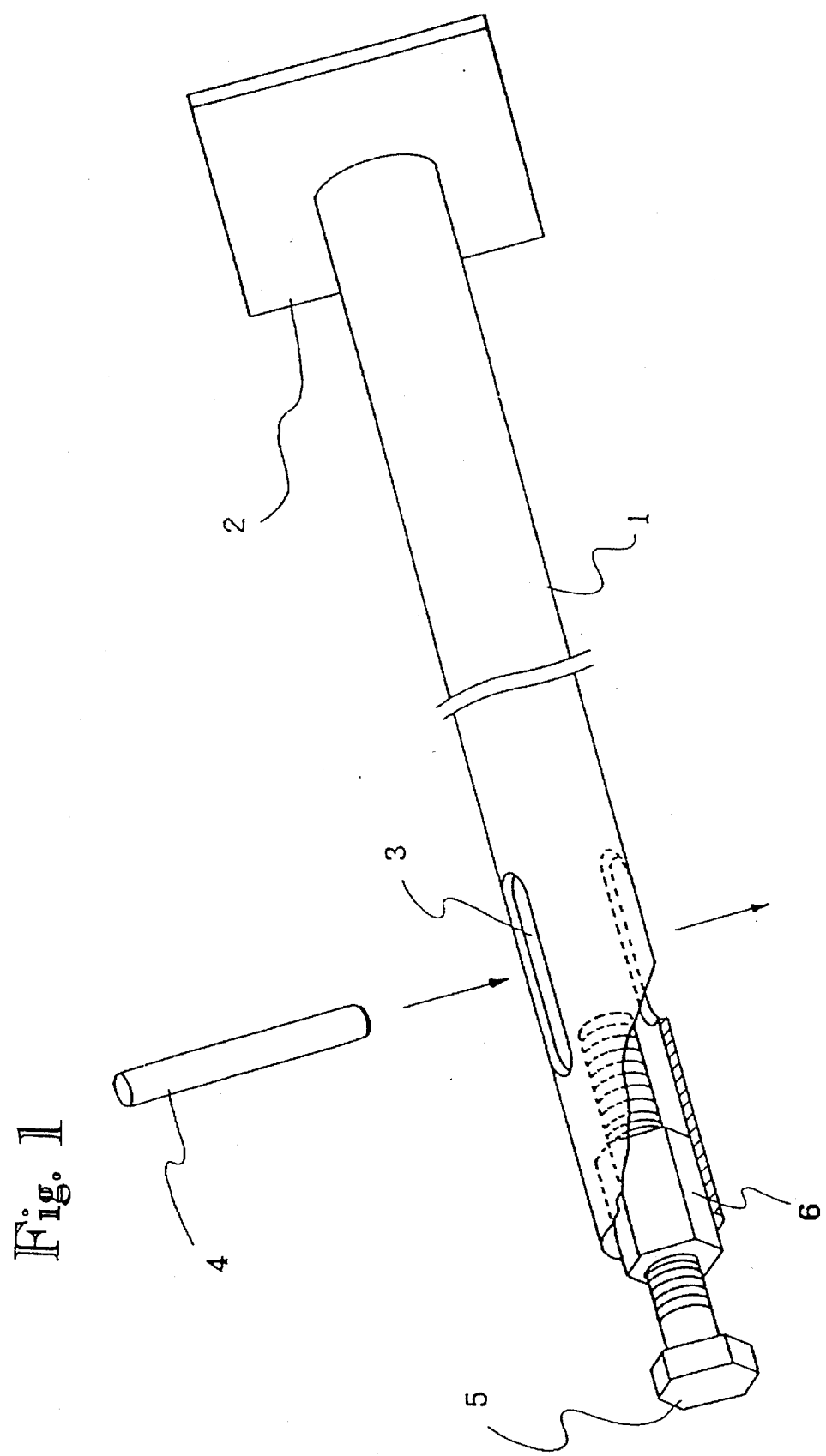
FIG. 1 is a perspective view showing a first embodiment of the present invention.
Figure 2:
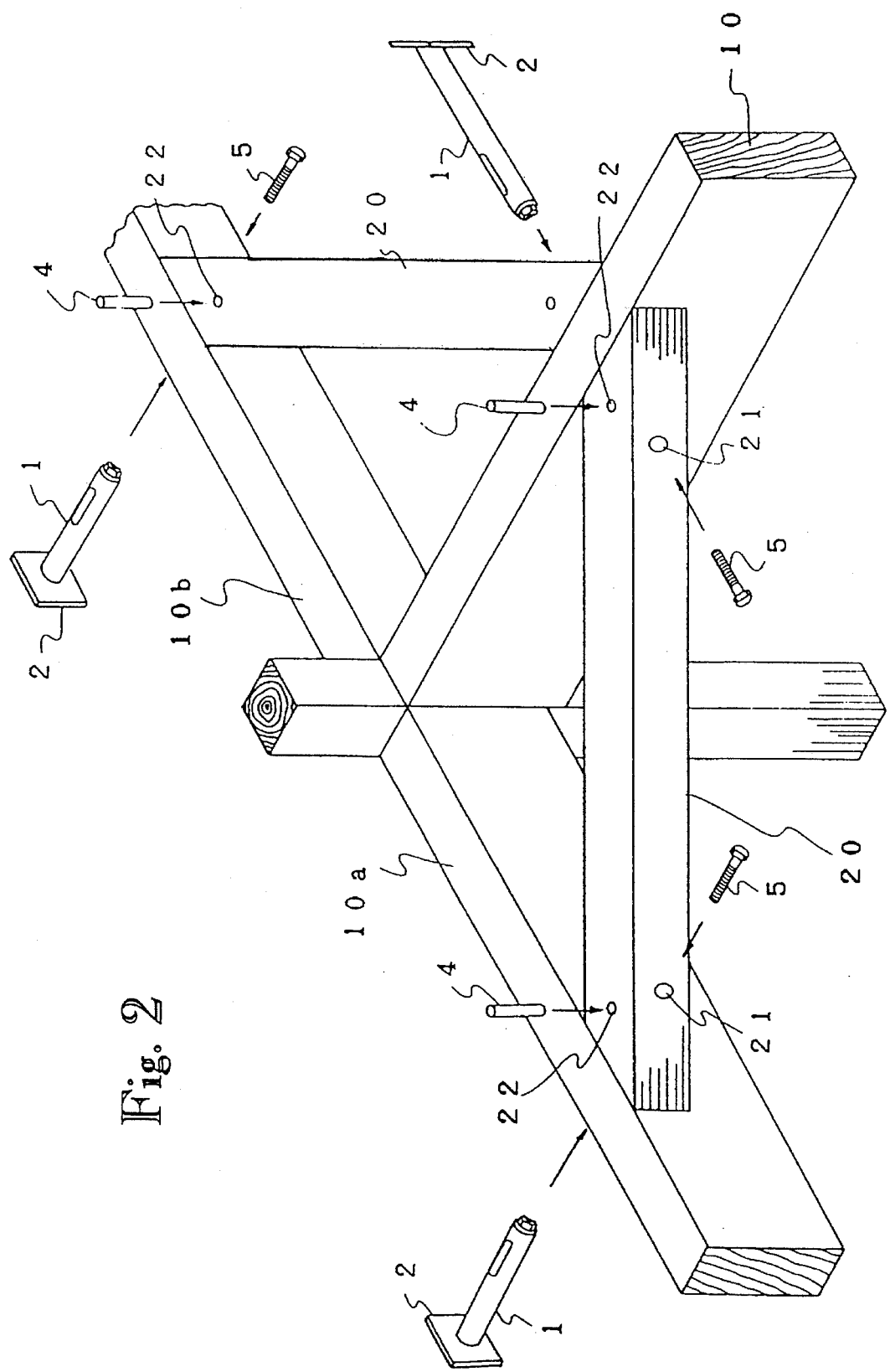
FIG. 2 is a perspective view showing a state in which a metal connector of the present invention is about to be employed for connection.
Figure 3:
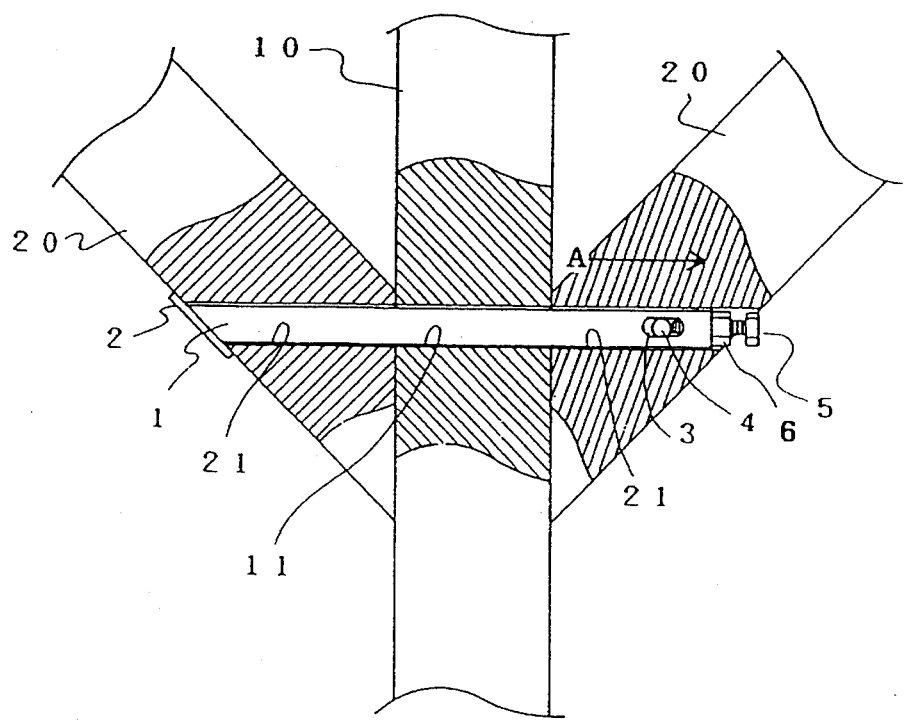
FIG. 3 is a cross-sectional view showing a state of use in the first embodiment.

Referring first to FIGS. 1, 2 and 3, a first embodiment of the present invention in which a horizontal angle brace is connected to both sides of a joist is explained.

FIGS. 1, 2 and 3 are a perspective view of the first embodiment, an exploded perspective view showing a state prior to connection using a metal connector of the first embodiment and a cross-sectional view showing essential parts during the use of the first embodiment, respectively.

In these views, the main metal member 1 is cylindrical-shaped and has a transverse cross-sectional shape which is the same as the transverse cross-sectional shape of through-holes 11, 21 formed in wooden members, that is a joist 10 and a horizontal angle brace 20, so that the main metal member 1 may be passed through the through-holes 11, 21.

Consequently, if the transverse cross-sectional profile of the through-holes 11, 21 formed in the wooden members is a square, the main metal member 1 may be square-shaped. It is however preferred that the through-holes 11, 21 formed in the wooden members be of a circular transverse cross-section so that these through-holes may be bored easily by using only a drill.

A stop 2 is provided at an end of the main metal member 1 at an angle corresponding to a connection angle of the horizontal angle brace 20 to the joist 10. Although the main metal member 1 is shown as being secured to the stop 2 by welding, it may also be secured by any other known means than welding, such as screwing.

A pair of elongated openings 3 are formed in the lateral sides of the main metal member 1 in the vicinity of the other end thereof to permit a pin 4 to be passed through the main metal member 1. The pin 4 is passed through the main metal member 1 by being introduced into the elongated openings 3 and is preferably formed of stainless steel having a superior strength.

A tightening bolt 5 is of a length such that the distal end thereof is caused to bear against the pin 4 when the bolt is tightened.

A threaded portion 6 of the tightening bolt 5 is formed by providing a nut at the other end of the main metal member 1. It is noted that the threaded portion 6 of the tightening bolt 5 may be formed by directly tapping a female screw on the inner wall surface of the other end of the main metal member 1.

The above-described metal connector according to the first embodiment is employed in the following manner.

That is, when the horizontal angle brace 20 is connected to the joist 10, the through-hole 11 is formed through the joist 10, while the through-hole 21 communicating with the through-hole 11 is formed through the horizontal angle brace 20. Besides, a through-hole 22 radially traversing the through-hole 21 is formed at a position in register with the elongated openings 3 in the main metal member 1. These through-holes are bored in advance at a site having a favorable working environment, such as a factory. When the connecting operation is performed at the construction site, a pair of the horizontal angle braces 20 are combined with the joist 10 from both sides of the joist so that the through-holes 11, 21 communicate with each other. The main metal member 1 then is introduced from the through-hole 21 formed in one of the horizontal angle braces 20 and is passed through the joist 10 and the two horizontal angle braces 20. The pin 4 is introduced into the through-hole 22 formed through the horizontal angle brace 20 so that the pin 4 is passed through the elongated openings 3 in the main metal member 1.

The tightening bolt 5, threadedly engaged with the main metal member 1, is tightened into the through-hole 21 formed in the horizontal angle brace 20 which has the pin 4 introduced in advance as described above. When the tightening bolt 5 is tightened in this manner, the distal end of the tightening bolt 5 abuts against a center part of the pin 4.

If the tightening bolt 5 is tightened further under such condition, the main metal member 1 is pulled in a direction shown by an arrow A in FIG. 3 so that the stop 2 can abut against the lateral side of the horizontal angle brace 20.

This causes the joist 10 and the horizontal angle braces 20, 20 on both sides of the joist to be sandwiched between the stop 2 and the pin 4, so that the joist 10 and the horizontal angle braces 20, 20 are connected rigidly to one another.

Figure 4:
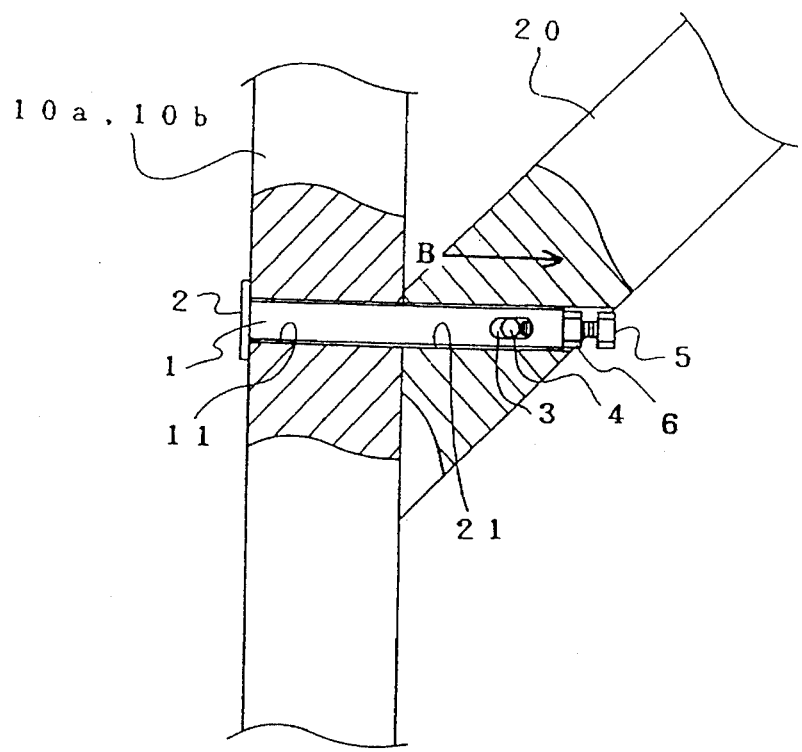
FIG. 4 is a cross-sectional view showing a state of use in the second embodiment.

Referring to FIGS. 2 and 4, a second embodiment of the invention in which horizontal angle braces are connected to sides of a joist 10a and a girth or a pole plate, referred to hereinafter as the pole plate 10b or the like, is hereinafter explained.

In the metal connector of the second embodiment, the main metal member 1 is shorter than that of the case of the first embodiment, and the stop 2 is mounted at a right angle to the main metal member 1.

The connecting operation is made in the following manner.

First, the joist 10a and the pole plate 10b are combined with the horizontal angle braces 20 so that the through-holes 11, 21 communicate with each other. The main metal members 1 then are introduced via the through-holes 11, 11 in the joist 10a and the pole plate 10b so as to be passed through the joist 10a and the pole plate 10b. The pins 4, 4 then are introduced into the through-holes 22, 22 formed in the horizontal angle braces 20 so as to be passed through the elongated openings 3,3 in the main metal member 1.

The tightening bolts 5, 5 then are threadedly engaged with the main metal members 1, 1 via the through-holes 21, 21 formed in the horizontal angle braces 20 which has the pins 4, 4 introduced in advance, and the tightening bolts 5, 5 are tightened. This causes the pins 4, 4 to abut against the tightening bolts 5, 5. If the tightening bolts 5, 5 are tightened further under such condition, the main metal members 1, 1 are pulled in a direction B in FIG. 4 so that the stops 2, 2 are caused to bear against the lateral sides of the joist 10a and the pole plate 10b.

This causes the joist 10a and the pole plate 10b to be sandwiched between the stops 2, 2 and the pins 4, 4, so that the joist 10a, the pole plate 10b and the horizontal angle braces 20,20 are connected rigidly to one another.

Referring to FIGS. 5, 6 and 7, a third embodiment of the present invention, in which a principal rafter 30 and a tie beam 40, a principal rafter 30 and a knee brace 50, and a tie beam 40 and a knee brace 50, are connected to each other, respectively, is explained.

With the metal connector of the present third embodiment, through-holes 7 passed through by a pin are formed at diametrically opposite lateral sides in the vicinity of one end of the main metal member 1, in place of the stop 2 in the first and second embodiments. Although the through-holes 7 are formed in the embodiment of FIG. 5 in the same direction as the elongated holes 3, the through-holes 7 may also be formed in two directions, that is in the same direction as the elongated holes and in a direction different by 90° from such direction.

A bolt, pin or the like 8 is inserted via the through-holes 7 so as to be passed through the main metal member 1, and is preferably formed of stainless steel having excellent strength.

The metal connector, constructed as described above, is employed for connecting wooden components, such as the principal rafter 30 and the tie beam 40, the principal rafter 30 and the knee brace 50, and the tie beam 40 and the knee brace 50, to each other, by way of examples.

Taking an example of connecting the principal rafter 30 and the tie beam 40, the sequence of the connecting operations is explained.

First, the principal rafter 30 and the tie beam 40 are combined together, by the same sequence of operations as in the first and second embodiments, so that through-holes 31, 41 communicate with each other. The main metal member 1 is fitted via the through-hole 31 in the principal rafter 30 and the through-holes 41 formed in the tie beam 40 so as to be passed through the principal rafter 30 and the tie beam 40. The bolt or the pin 8 is fitted into a through-hole 23 formed in the principal rafter 30 for securing the main metal member 1 to the principal rafter 30.

The pins 4 are then introduced into through-holes 22 formed in the tie beam 40, by the same sequence of operations as in the first and second embodiments, so that the pins 4 are passed through the elongated holes 3 in the main metal member 1. A tightening bolt 5 then is threadedly engaged and tightened via the through-hole 41 in the tie beam 40 into which the pin 4 is driven in advance.

When the tightening bolt 5 is tightened in this manner, the distal end of the tightening bolt 5 is caused to bear against the mid portion of the lateral side of the pin 4, as in the first and second embodiments. When the tightening bolt 5 is tightened further, the main metal member 1 is pulled in a direction A in FIG. 7a, so that the principal rafter 30 and the tie beam 40 are sandwiched by the pins 4 and the bolts or pins 8 so as to be connected rigidly to each other.

Figure 7A:
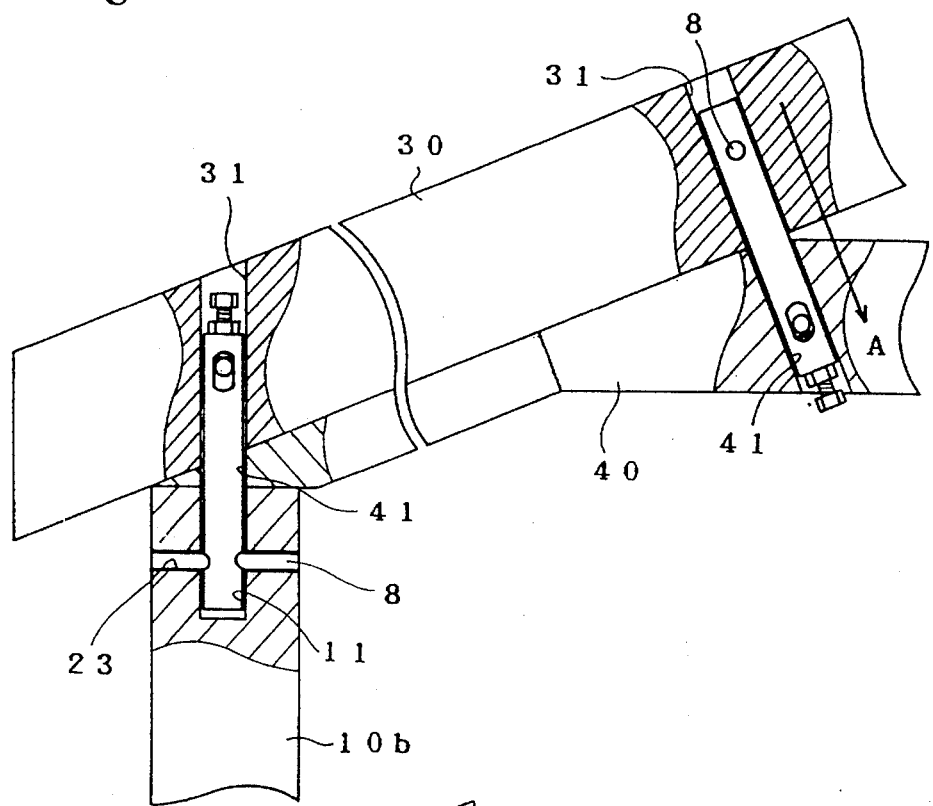
FIGS. 7(a) and (b) are cross-sectional views showing a state of use in the third embodiment.
Figure 7B:
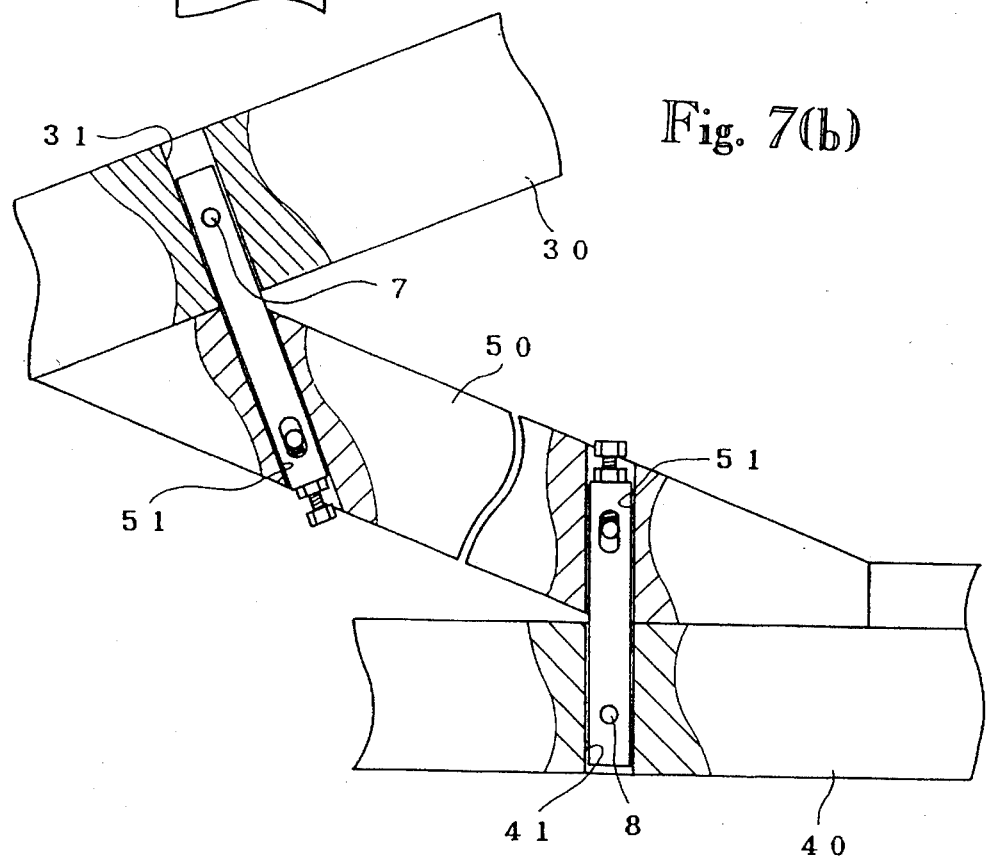

Meanwhile, connections among wooden members other than those mentioned above, such as connections among the principal rafter 30, tie beam 40 and the pole plate 10b, shown in FIG. 7a, a connection between the principal rafter 30 and the knee brace 50, and a connection between the tie beam 40 and the knee brace 50, shown in FIG. 7b, may be made rigidly by the same sequence of the connecting operations as described above.

With the metal connector according to the present third embodiment, it becomes unnecessary to provide the main metal member 1 with the stop 2, by virtue of the provision of the through-hole 7, so that the machining of the main metal member may be facilitated significantly.

Besides, since the stop 2 may be eliminated, variable lengths or connecting angles of the wooden members to be connected together may be accommodated by simply changing the length of the main metal member 1 or the position of the through-hole 23 for the pins, so that the metal connector may be employed for connecting any kinds of the wooden components. In particular, the metal connector may be employed effectively for connecting an elongated member having a perpendicular connecting angle in the perpendicular direction.

On the other hand, the metal connector according to the present invention also has a function of a dowel and hence is capable of preventing relative deviation between the wooden members.

In addition, the metal connector of the present invention may also be employed for connecting wooden components other than those mentioned above, such as a connection between a brace and a pillar, the foundation or the like.

I claim:

1. A metal connector for connecting wooden members to each other, comprising:

a main metal member in a form of a tube which passes through holes formed in said wooden members, a stop provided at one end of said main metal member at an angle corresponding to a connecting angle of one of the wooden members attached thereto, elongated holes formed in lateral sides of said main metal member in a vicinity of the other end thereof, a pin situated in said elongated holes by passing through openings formed in one of said wooden members, and a tightened bolt provided at said other end of said main metal member so that a distal end of said bolt abuts against said pin when the bolt is tightened.

2. The metal connector for a construction as claimed in claim 1 wherein said stop is provided perpendicularly to the main metal member.

3. A metal connector for the construction for connecting wooden members to each other, comprising:

a main metal member in a form of a tube which passes through holes formed in said wooden members, through-holes formed in the main metal member in a vicinity of one end thereof, a first pin situated in said through-holes by passing through first openings formed in one of said wooden members, elongated holes formed in lateral sides of said main metal member in a vicinity of the other end thereof, a second pin situated in said elongated holes by passing through second openings formed in the other of the wooden members, and a tightening bolt provided at said other end of said main metal member so that a distal end of said bolt abuts against said second pin when the bolt is tightened.

4. The metal connector for the construction as claimed in claim 3, wherein said through-holes are formed so that an axis of said through-holes and an axis of said elongated holes are in a same plane.

5. The metal connector for a the construction as claimed in claim 3, wherein said through-holes are formed so that an axis of said through-holes and an axis of said elongated holes are in different planes.

6. The metal connector for a construction as claimed in claim 3, wherein said through-holes are formed of two pairs of through-holes facing each other, an axis of said one pair of the through-holes and an axis of said elongated holes being located in a same plane, and an axis of the other pair of the through-holes and said axis of the elongated holes being located in different planes.

* * * * *